(12) United States Patent
Doddridge

(10) Patent No.: US 8,660,399 B2
(45) Date of Patent: Feb. 25, 2014

(54) LINEARITY CALIBRATION STANDARD FOR FIBER OPTIC POWER METERS

(75) Inventor: Lance S Doddridge, Ontario, CA (US)

(73) Assignee: The United States of America represented by the Secretary of the Navy, Washington, DC (US)

( * ) Notice: Subject to any disclaimer, the term of this patent is extended or adjusted under 35 U.S.C. 154(b) by 309 days.

(21) Appl. No.: 13/157,033

(22) Filed: Jun. 9, 2011

(65) Prior Publication Data

US 2012/0314209 A1    Dec. 13, 2012

(51) Int. Cl.
*G02B 6/00*    (2006.01)
(52) U.S. Cl.
USPC .......................................................... 385/140
(58) Field of Classification Search
None
See application file for complete search history.

(56) References Cited

PUBLICATIONS

Vayshenker et al., "Automated measurement of nonlinearity of optical fiber power meters", Proc. SPIE 2550, Photodetectors and Power Meters II, 12 (Sep. 26, 1995).*

* cited by examiner

*Primary Examiner* — Sung Pak

(57) ABSTRACT

An integrated, more automated system for determining the linearity of measurements of fiber optic power meters reduces the time and expense needed for linearity calibration. The system uses the triplet superposition method of linearity calibration and aids in performing the necessary series of measurements. A linearity measurement system for an optical power meter comprises an apparatus to output an optical signal to the optical power meter, the apparatus configured to output the optical signal at a controllable plurality of optical powers, a controller for controlling an optical power output from the apparatus to the optical power meter, a display device for displaying a state of the apparatus based on information from the controller, and an input device for commanding the controller to control the optical power output from the apparatus to the optical power meter.

4 Claims, 4 Drawing Sheets

LINEARITY CALIBRATION STANDARD FOR FIBER OPTIC POWER METERS

BACKGROUND OF THE INVENTION

1. Field of the Invention

The present invention relates to an integrated system for automatically providing the proper conditions to make linearity of measurements of fiber optic power meters.

2. Description of the Related Art

An optical loss test set (OLTS) consists of an optical power meter and an optical power source. Fiber optic communications systems typically use 850-nm or 1300-nm optical sources for multimode fiber optic networks, and 1310-nm or 1550-nm sources for single mode fiber optic networks. The OLTS power sources also produce optical signals at these wavelengths, and the optical power meter is calibrated to measure the power at each of these wavelengths. The OLTS is capable of making both absolute and relative power measurements. However, the most common measurement of interest taken by the OLTS is the relative power measurement. The typical OLTS provides a measurement range of at least 60 dB in most cases, and in some cases can exceed 100 dB.

In order to provide accurate measurements, an OLTS must be properly calibrated. The calibration of OLTSs is an issue that has been standardized by recognized standards organizations. For example, the National Institute of Standards and Technology (NIST), the Telecommunications Industry Association (TIA), and the International Electrotechnical Committee (IEC) have adopted standardized procedures for calibrating the several measurement parameters of the OLTS. The linearity of the optical power meter is a parameter of great importance as it determines the accuracy of the relative power measurements made by the OLTS. In order to calibrate the linearity of an optical power meter, the linearity must be measured to verify that the measurements made by the optical power meter are within specified tolerances.

Conventional optical power meter linearity measurement requires manual setup and operation, which is time-consuming and expensive. Alternatively, fully automated systems are available for performing optical power meter linearity measurement on high-end optical power meters that have control and measurement interfaces. However, lower-end optical power meters, such as handheld optical power meters, do not typically have such control and measurement interfaces. A need arises for a more automated technique for optical power meter linearity measurement for lower-end optical power meters, such as handheld optical power meters, which reduces the time and expense needed for linearity calibration.

SUMMARY OF THE INVENTION

An integrated, more automated system for determining the linearity of measurements of fiber optic power meters reduces the time and expense needed for linearity calibration. The system uses the triplet superposition method of linearity calibration and aids in performing the necessary series of measurements.

For example, a linearity measurement system for an optical power meter comprises an apparatus to output an optical signal to the optical power meter, the apparatus configured to output the optical signal at a controllable plurality of optical powers, a controller for controlling an optical power output from the apparatus to the optical power meter, a display device for displaying a state of the apparatus based on information from the controller, and an input device for commanding the controller to control the optical power output from the apparatus to the optical power meter. The apparatus comprises an optical power splitter to split an input optical signal into two branches, two optical shutters controlled by the controller, one optical shutter in each of the two branches, each optical shutter to block or pass an optical signal in each branch, and an optical coupler to combine the optical signals in each branch into an output optical signal. The apparatus further comprises two variable optical attenuators controlled by the controller, one variable optical attenuator in each of the two branches, each variable optical attenuator to attenuate an optical signal in each branch. The apparatus further comprises a third optical attenuator controlled by the controller to attenuate the input optical signal. The apparatus further comprises multi-mode optical fiber carrying the optical signal.

As another example, a linearity measurement system for an optical power meter comprises an input optical fiber receiving an optical signal from an external optical power source, an optical power splitter having an input connected to the input optical fiber and two outputs, each output connected to an optical fiber, the optical power splitter to split the input optical signal into two branches, one branch on each optical fiber, two optical shutters controlled by a controller, each optical shutter having an input connected to one optical fiber from the optical power splitter and an output connected to an optical fiber, each optical shutter to block or pass an optical signal in each branch, an optical coupler having two inputs, each input connected to an optical fiber from an optical shutter, and an output connected to an output optical fiber, the optical coupler to combine the optical signals in each branch into an output optical signal, an output optical fiber to output the output optical signal to an external optical power meter, the controller for controlling an optical power output from the apparatus to the optical power meter, a display device for displaying a state of the apparatus based on information from the controller, and an input device for commanding the controller to control the optical power output from the apparatus to the optical power meter. The system further comprises two variable optical attenuators controlled by the controller, each variable optical attenuator connected between one output of the optical power splitter and the input of one optical shutter, each variable optical attenuator to attenuate an optical signal in each branch. The system further comprises a third optical attenuator controlled by the controller connected to the input optical fiber and the input of the optical power splitter to attenuate the input optical signal. The optical fibers are multi-mode optical fibers.

As another example, a method of measuring linearity of an optical power meter comprises entering at least one command into a linearity measurement system comprising an apparatus to output an optical signal to the optical power meter, the apparatus configured to output the optical signal at a controllable plurality of optical powers, a controller for controlling an optical power output from the apparatus to the optical power meter, a display device for displaying a state of the apparatus based on information from the controller, and an input device for commanding the controller to control the optical power output from the apparatus to the optical power meter, the at least one command to cause the linearity measurement system to output the optical signal at a first power level, measuring the first power level with an optical power meter, entering at least one command into the linearity measurement system to cause the linearity measurement system to output the optical signal at a second power level, measuring the second power level with the optical power meter, entering at least one command into the linearity measurement system to cause the linearity measurement system to output the optical signal at a third power level that is the sum of the first power level and the second power level, measuring the third power level with the optical power meter, and determining a linearity error of the optical power meter based on a difference between the measurement of the third power level and the sum of the measurements of the first power level and the second power level. The apparatus comprises an optical power splitter to split an input optical signal into two branches, two optical shutters controlled by the controller, one optical shutter in each of the two branches, each optical shutter to block or pass an optical signal in each branch, and an optical coupler to combine the optical signals in each branch into an output optical signal. The apparatus further comprises two variable optical attenuators controlled by the controller, one variable optical attenuator in each of the two branches, each variable optical attenuator to attenuate an optical signal in each branch. The apparatus further comprises a third optical attenuator controlled by the controller to attenuate the input optical signal. The apparatus further comprises multi-mode optical fiber carrying the optical signal.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

An integrated, automated system for determining the linearity of measurements of fiber optic power meters reduces the time and expense needed for linearity calibration. The system uses the triplet superposition method of linearity calibration and provides the proper conditions at each desired power level for an operator to take the necessary measurements.

The triplet superposition method includes of a set of three measurements. The power meter under test is stimulated with an arbitrary amount of optical power, and a measurement is made by the power meter under test. A second source of power is used to stimulate the power meter and a second measurement is taken. The third measurement is taken while simultaneously stimulating the power meter with both power sources. The third power level is the sum of the first two power levels. The non-linearity at this power level is the difference between the measured power level and the sum of the two power levels. This process is repeated for several power levels across the dynamic range of the power meter.

Figure 1:
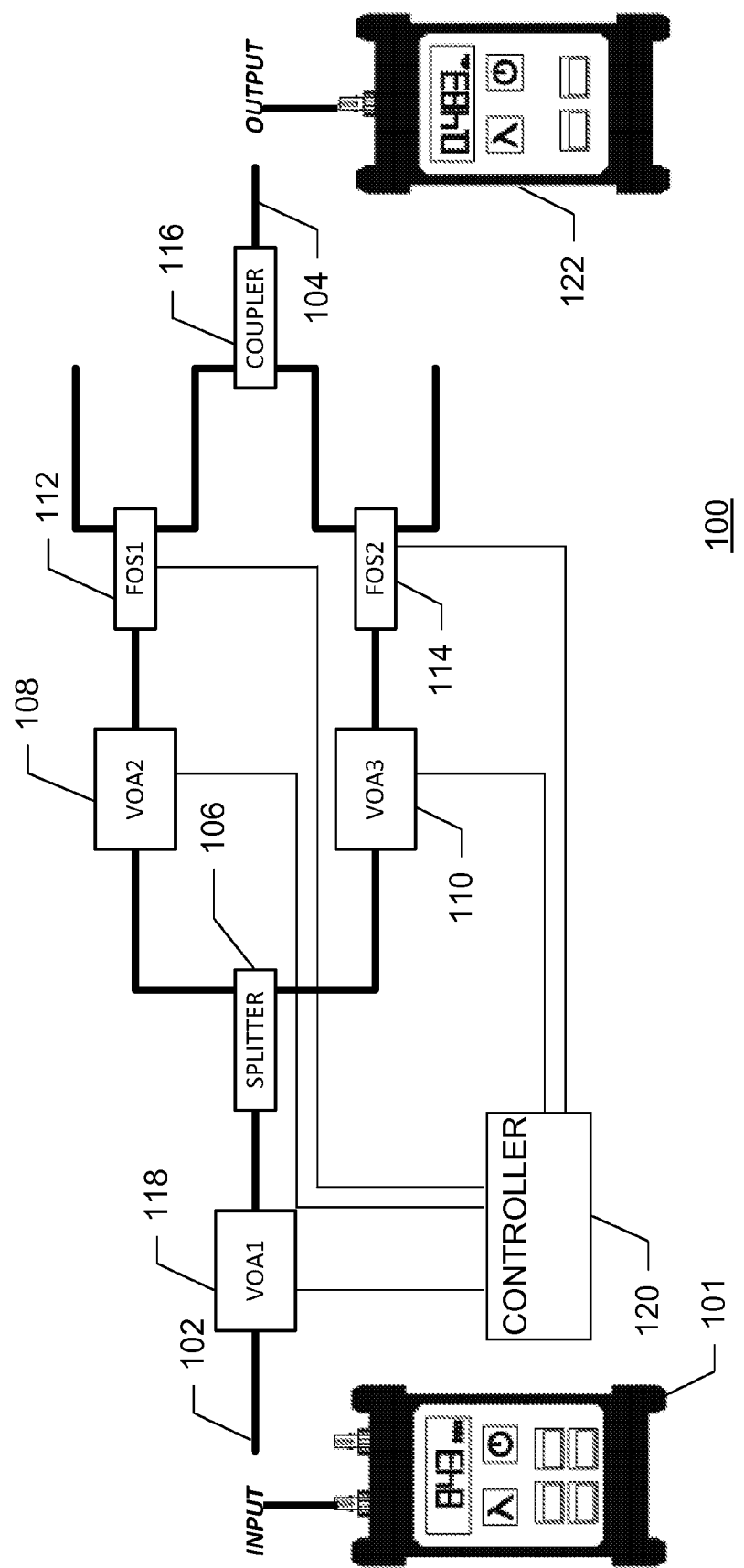
FIG. 1 is an exemplary block diagram of a system 100 for determining the linearity of measurements of fiber optic power meters.

An exemplary block diagram of a system 100 for determining the linearity of measurements of fiber optic power meters is shown in FIG. 1. A stable optical power source, such as optical power source 101 is required at the input 102 of the system. The output 104 of the system is connected directly to an optical power meter under test. The system takes the input optical power, and splits the power into two separate branches using optical power splitter 106. Each branch has a variable optical attenuator (VOA), such as VOA2 108 and VOA3 110 and a fiber optic switch (FOS), such as FOS1 112 and FOS2 114. The VOA provides for setting the power level through the branch, and the FOS is switched to direct the optical power to the output or away from the output. Likewise, VOA1 118 provides the capability to increase the overall dynamic range of the system. The optical power from each branch is coupled into the output 104 using optical power coupler 116. Output 104 is connected to the optical power meter under test 122.

Typically, power meters that are used in the field, such as hand-held power meters are capable of multi-mode measurement. Thus, advantageously, system 100 may be implemented using multi-mode fiber optic cable to connect the components.

Controller 120 controls the operation of the optical components of the system, such as the variable attenuation of VOAs 108, 110, and 118, and the switching state of FOSs 112 and 114. Controller 120 includes a keypad and display, as well as additional control circuitry. Control of the optical components may be provided by interfaces between the controller 120 and the optical components, based on the interface provided by the optical component. Typical interfaces include a serial interface (such as RS-232), a general purpose interface bus (GPIB), a Universal Serial Bus (USB), etc., as well as direct control signals, such as directly applied voltages. The selection of such interfaces is a matter well within the skill of one of ordinary skill in the art and any and all such interfaces are contemplated by the present invention.

Figure 2:
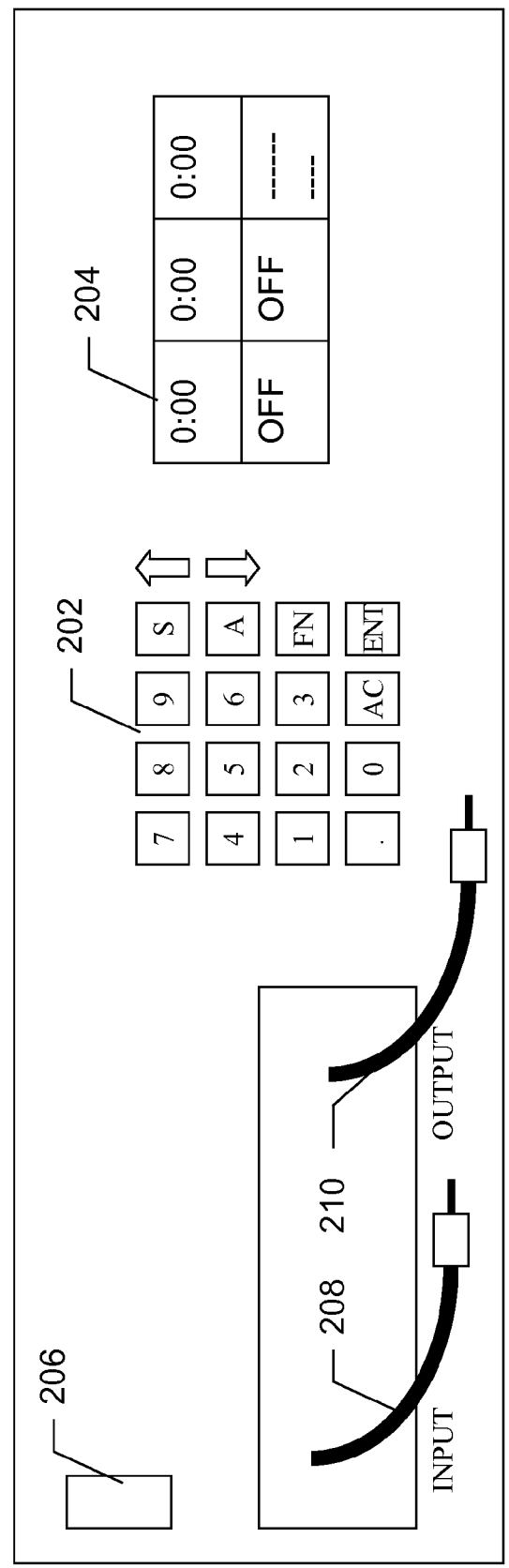
FIG. 2 is an exemplary diagram of an implementation of a linearity measurement system shown in FIG. 1.

An example of an implementation of the linearity measurement system 100 shown in FIG. 1, is shown in FIG. 2. In this example, the system includes a keypad 202 and display 204, a power switch 206, and an input 208 and an output 210. Keypad 202 and display 204 provide the capability for a user to control the operation of the system and to set and observe the operational parameters of the system. Input 208 connects to an optical power source that supplies the optical power for the system. Output 210 is connected to an optical power meter under test and provides the optical power to be measured by the meter.

Because of the continually improving performance of the handheld optical power meters, it has become necessary to calibrate the handheld optical power meter linearity with the triplet superposition method, while at the same time keeping the calibration process simple (and less costly).

Referring to FIG. 1, it may be seen that during a linearity calibration, the source optical power is turned on, the FOS from one branch, such as FOS1 112, is turned on and the other FOS, such as FOS2 114, is turned off. This allows only the optical power from one branch to stimulate the optical power meter detector. Once a measurement is made on the optical power meter under test, the first branch FOS, such as FOS1 112, is turned off, and the second branch FOS, such as FOS2 114, is turned on. A new power measurement is taken by the optical power meter. Finally, the FOSs of both branches, such as FOS1 112 and FOS2 114, are turned on, and a third power measurement is taken. The third measurement is compared to the sum of the first two measurements to determine the local non-linearity at that power level. For example, if the first measurement is 5 mW and the second measurement is 5 mW, then the third measurement should be 10 mW. However, due to non-linearity in the power meter under test, the third reading may be different, such as 10.1 mW. This non-linearity is easily determined using this testing.

Testing at other power levels throughout the dynamic range of the power meter may be performed by adjusting the attenuation of VOA1 118. While taking the power measurements through the individual branches, it is possible to toggle the power between the two branches using the FOSs, such as FOS1 112 and FOS2 114, and also to adjust the power in each branch to the same level by setting VOA2 108 and VOA3 110 to appropriate levels. If the power levels through the branches are the same, then the sum of the two power levels is simply 3 dB greater than the power through the individual branches (or +3.01 dB to be more precise).

The major components used to implement the triplet superposition method consist of three optical attenuators (though VOA2 and VOA3 are optional), a fiber optic splitter (50/50), a fiber optic coupler (backwards 50/50 fiber optic splitter), and two fiber optic switches. Examples of suitable components that may be used include the Oz Optics DD-100 series VOA and the Newport MPSN 62-12 FOS. If the system is made of individual components, a minimum of 9 connections are required, with at least 6 connections between the input and output through either branch. At each connection, there will be a level of insertion loss, typically on the order of 0.3 dB to 0.5 dB, depending on the quality of the connector-to-connector interface. Additionally each component has its own insertion loss. For the whole system, insertion losses can range from 6 or 7 dB to greater than 13 dB. For standard optical power sources, this reduces the useable power range below the upper end of the power meter's dynamic range.

Reduced insertion loss can be achieved if the connectors are replaced with fusion splices between the components. This can bring the total system insertion loss down by as much as 3.0 dB. The components will have to remain as dedicated parts of the linearity calibration system, however. As an additional enhancement, even the input and output of the system may not use bulkhead connectors, but may make use of fiber optic cables spliced into the system.

The invented system can work with most fiber optic power meters with silicon (Si), germanium (Ge), or indium gallium arsenide (InGaAs) photodetectors. For example, InGaAs detector has a spectral responsivity slope of 0.53%/nm at 850 nm, 0.09%/nm at 1300 nm, and 0.05%/nm at 1550 nm. Since the spectral responsivity slopes at 1300 nm and 1550 nm are so close, it is only necessary to test linearity at one of those wavelengths. However, the spectral responsivity slope at 850 nm is dramatic enough to merit linearity calibration at that wavelength. Thus, fiber optic power meters with InGaAs can be fully calibrated for linearity by selecting only those two wavelengths, 850 nm and 1300 nm. Calibration of InGaAs optical power meters may also be done at 1550 nm, although this is unnecessary when the 1300 nm linearity calibration is done. The present invention contemplates operation at these and all other useful wavelengths, as well as at all wavelengths that may become useful in the future.

The linearity measurement system provides a very low uncertainty (<0.01 dB) which allows for a 4:1 Test Accuracy Ratio (TAR) or better for most handheld optical power meters. The TAR is the ratio of the measurement accuracy of the device under test to the measurement accuracy of the standard used to calibrate it. In the example shown in FIG. 2, the only components accessible to the calibration technician are the input 208 and output 210 cables, which rest in a recessed area for storage. This configuration allows for quick and simple setup and take-down, as well as quick calibration times. Perhaps one of the greatest benefits in using the triplet superposition method is the fact that the system does not need calibration itself. The method is the standard, not the embodiment. This is of great benefit logistically, since a laboratory will not have to send the system away for calibration, or experience down-time when it is out for calibration.

Figure 3:
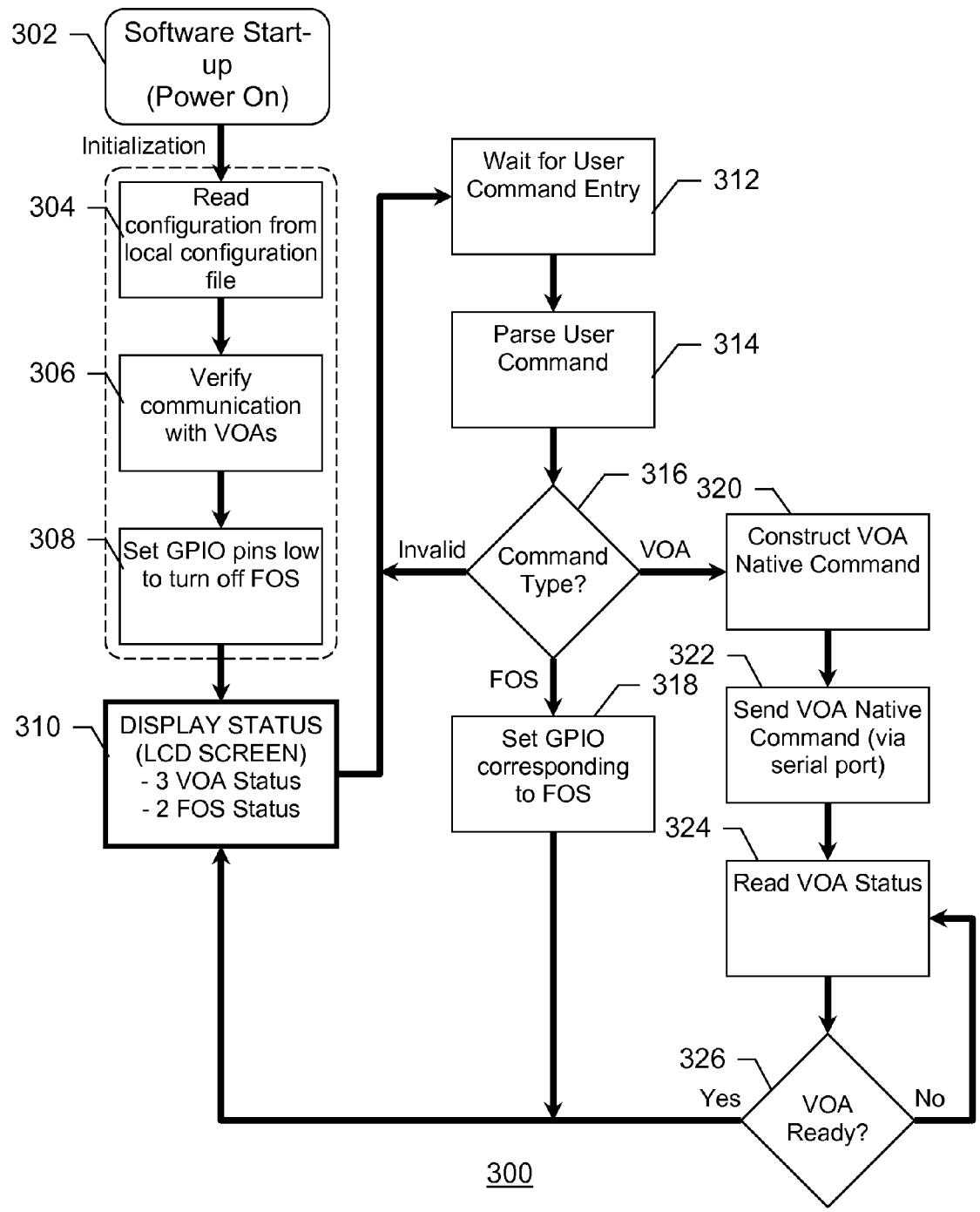
FIG. 3 is an exemplary flow diagram of a process of operation of a linearity measurement system, shown in FIGS. 1 and 2.

An exemplary flow diagram of a process 300 of operation of linearity measurement system 100, shown in FIGS. 1 and 2, is shown in FIG. 3. Process 300 begins with step 302, in which the software that implements the process starts-up at power on of the system. Steps 304-308 perform initialization of the system. In step 304, configuration information is read from a local configuration file. In step 306, communication with the VOAs is verified, that is, it is determined that proper communications with the VOAs has been established. In step 308, the FOSs are turned to a closed shutter state, such as by setting output pins of a GPIO bus to a state that configures the FOSs to closed. In step 310, the status of the VOAs and FOSs is displayed.

In step 312, the system waits for user command entry. Upon entry of a command by the user, in step 314, the command is parsed. In step 316, the command type is determined. If the command is invalid, the process loops back to step 312 and waits for another command to be entered. If the command is valid, and is an FOS command, then in step 318, the FOS indicated by the command is set to the state (open or closed) indicated by the command. Typically, this is done by setting output pins of a GPIO bus to a state that configures the indicated FOS to the indicated state. The process loops back to step 310 to display the updated status of the VOAs and FOSs and then returns to step 312, to wait for additional user command entry.

If, in step 316, the command is valid, and is a VOA command, then in step 320, a native VOA command is constructed to set the VOA indicated by the command to the state indicated by the command. In step 322, the VOA native command is sent to the indicated VOA, such as using a serial port. In response, the VOA begins to set itself to the indicated state. In step 324, the status of the VOA is read. In step 326, it is determined whether the VOA status is that the VOA is ready. If not, then the process loops back to step 324, and the status of the VOA is read again. If the VOA status is ready, then the VOA has finished setting itself to the indicated state. The process loops back to step 310 to display the updated status of the VOAs and FOSs and then returns to step 312, to wait for additional user command entry.

Figure 4:
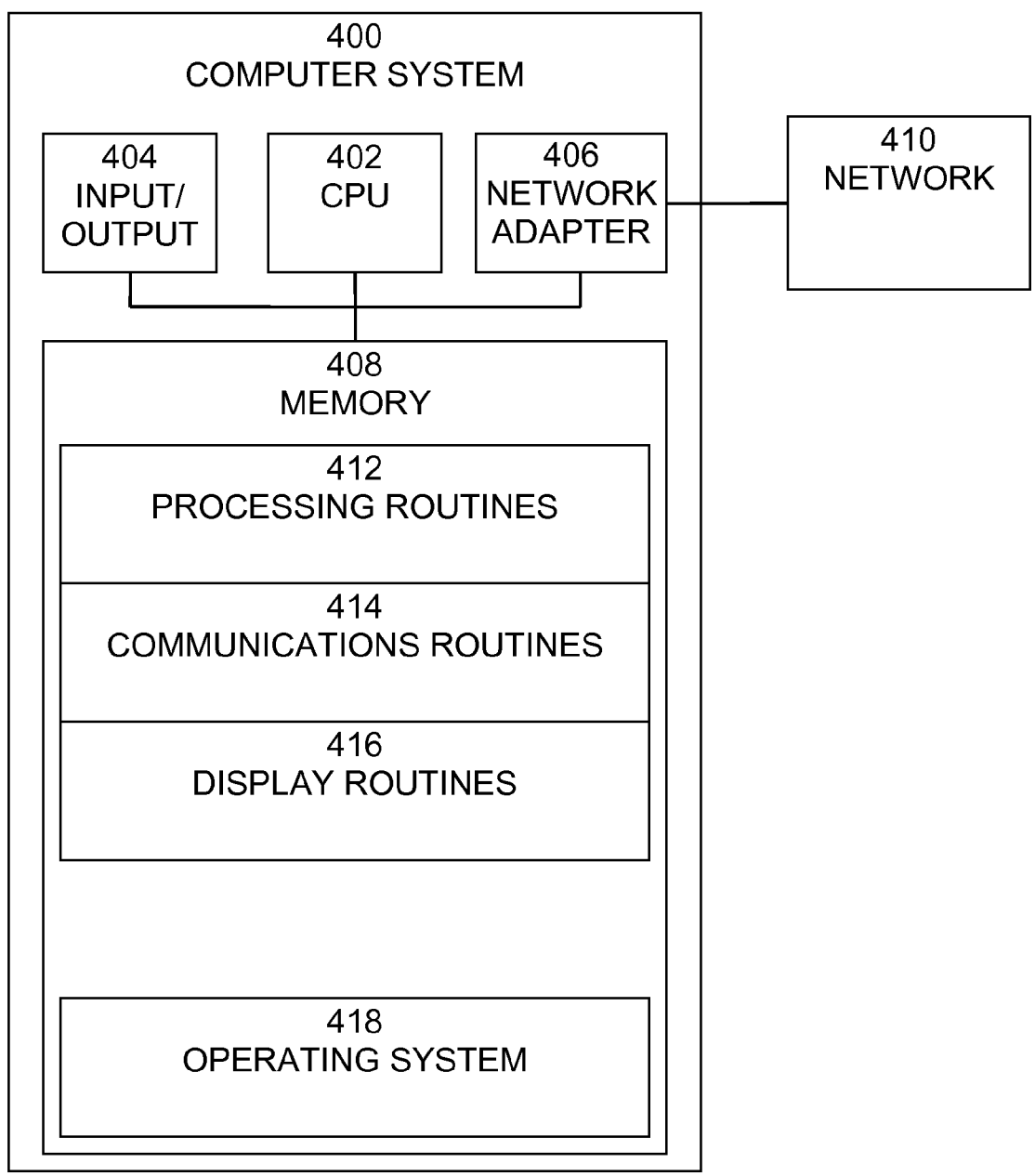
FIG. 4 is an exemplary block diagram of an exemplary computer system 400, which may be used to control operation of the linearity measurement system.

An exemplary block diagram of an exemplary computer system 400, which may be used to control operation of the linearity measurement system, is shown in FIG. 4. Computer system 400 may be a programmed general-purpose computer system, such as a personal computer, workstation, server system, and minicomputer or mainframe computer, or computer system 400 may be a microprocessor, microcomputer, or microcomputer embedded in other circuitry. Computer system 400 includes processor (CPU) 402, input/output circuitry 404, network adapter 406, and memory 408. CPU 402 executes program instructions in order to carry out the functions of the present invention. Although in the example shown in FIG. 4, computer system 400 is a single processor computer system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which computer system 400 is implemented on a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or Serial Advanced Technology Attachment (SATA), or a variation or enhancement thereof, or a fiber channel-arbitrated loop (FC-AL) interface.

In the example shown in FIG. 4, memory 408 includes processing routines 412, communications routines 414, display routines 416, and operating system 418. Processing routines 412 perform the logic and control of process 300, shown in FIG. 3. Communications routines 414 provide communication with devices such as the VOAs and the FOSs, such as constructing and transmitting native VOA commands and setting the GPIO to control the FOSs. Display routines 416 provide operation and information display using of the status of the system and its components, such the VOAs and the FOSs. Operating system 418 provides overall system functionality.

It is important to note that while the present invention has been described in the context of a fully functioning data processing system, those of ordinary skill in the art will appreciate that the processes of the present invention are capable of being distributed in the form of a computer program product including a computer readable medium of instructions. Examples of non-transitory computer readable media include storage media, examples of which include, but are not limited to, floppy disks, hard disk drives, CD-ROMs, DVD-ROMs, RAM, and, flash memory.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A linearity measurement system for an optical power meter comprising:
    an input optical fiber receiving an optical signal from an external optical power source;
    an optical power splitter having an input connected to the input optical fiber and two outputs, each output connected to an optical fiber, the optical power splitter to split the input optical signal into two branches, one branch on each optical fiber;
    two variable optical attenuators controlled by the controller, each variable optical attenuator connected between one output of the optical power splitter and the input of one optical switch, each variable optical attenuator to attenuate an optical signal in each branch;
    two optical switches controlled by a controller, each optical switch having an input connected to one optical fiber from the optical power splitter and an output connected to an optical fiber, each optical switch to block or pass an optical signal in each branch;
    an optical coupler having two inputs, each input connected to an optical fiber from an optical switch, and an output connected to an output optical fiber, the optical coupler to combine the optical signals in each branch into an output optical signal;
    an output optical fiber to output the output optical signal to an external optical power meter;
    the controller for controlling an optical power output from the system to the optical power meter;
    a display device for displaying a state of the system based on information from the controller; and
    an input device for commanding the controller to control the optical power output from the system to the optical power meter.

2. The linearity measurement system of claim 1, further comprising:
    a third optical attenuator controlled by the controller connected to the input optical fiber and the input of the optical power splitter to attenuate the input optical signal.

3. The linearity measurement system of claim 1, wherein the optical fibers are multi-mode optical fibers.

4. The linearity measurement system of claim 1, wherein the optical fibers are multi-mode optical fibers and each multi-mode optical fiber is connected by fusion splice

* * * * *